No. 756,862. PATENTED APR. 12, 1904.
A. LEHNER.
APPARATUS FOR WEIGHING AND SORTING SKEINS OF YARN.
APPLICATION FILED APR. 11, 1903.
NO MODEL. 2 SHEETS—SHEET 1.
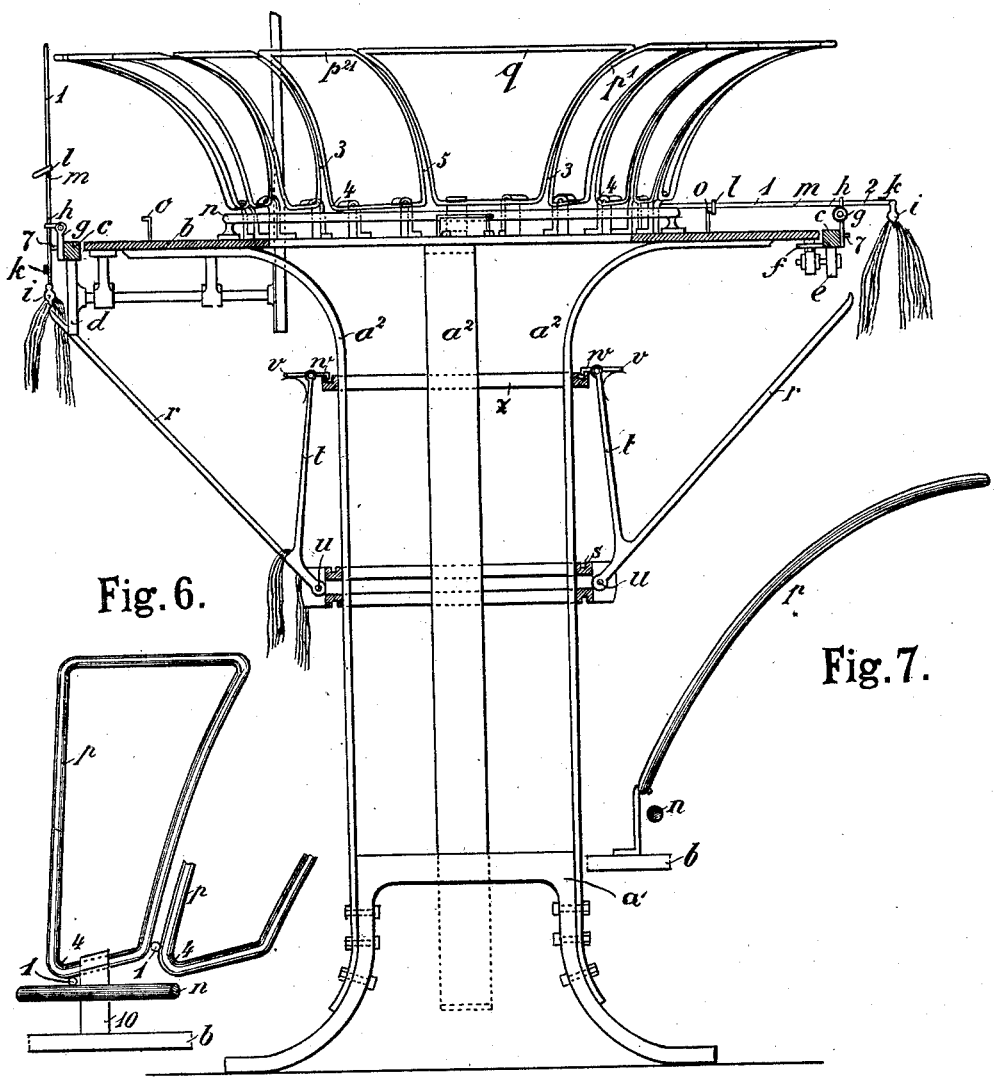
WITNESSES INVENTOR
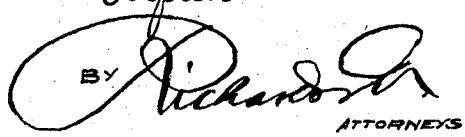

No. 756,862. PATENTED APR. 12, 1904.
A. LEHNER.
APPARATUS FOR WEIGHING AND SORTING SKEINS OF YARN.
APPLICATION FILED APR. 11, 1903.
NO MODEL. 2 SHEETS—SHEET 2.

WITNESSES
INVENTOR
Alfred Lehner
ATTORNEYS

No. 756,862.                                                    Patented April 12, 1904.

UNITED STATES PATENT OFFICE.

ALFRED LEHNER, OF ZURICH, SWITZERLAND.

APPARATUS FOR WEIGHING AND SORTING SKEINS OF YARN.

SPECIFICATION forming part of Letters Patent No. 756,862, dated April 12, 1904.

Application filed April 11, 1903. Serial No. 152,254. (No model.)

*To all whom it may concern:*

Be it known that I, ALFRED LEHNER, a citizen of Germany, residing in Zurich, in the canton of Zurich, Republic of Switzerland, (whose post-office address is No. 73 Weinbergstrasse, Zurich,) have invented certain new and useful Improvements in Apparatus for Weighing and Sorting Skeins of Yarn and Thread; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

I have applied for patents in the following countries: Application in Germany on November 20, 1902; application in Switzerland on November 25, 1902; application in France on March 9, 1903; application in Great Britain on March 13, 1903; application in Italy on March 19, 1903.

The mechanical arrangements hitherto used for automatically weighing and sorting skeins of wool, cotton, silk, and other threads could not be widely adopted owing to defective work caused by the complicated nature of their structure. It was specially difficult, if, in fact, not impossible, to use them for automatically weighing open skeins, such as are preferably used in the silk industry, without subjecting the skeins to further wear and tear. The present invention remedies these drawbacks. The weighing and sorting machine which is the subject of the invention while being simple in construction provides means for weighing the skeins to any degree of nicety that may be desired. On an annual rotary part $a$ a number of weighted levers are pivoted with appliances by means of which as the levers are rotated a gradual change in the position of the constituent parts of same is effected for the purpose of gradually diminishing the moment of each weighted lever-arm until it is overbalanced by the moment of the load suspended from it, a change being thus made in the position of the lever whereby the load can be removed.

Figure 2:
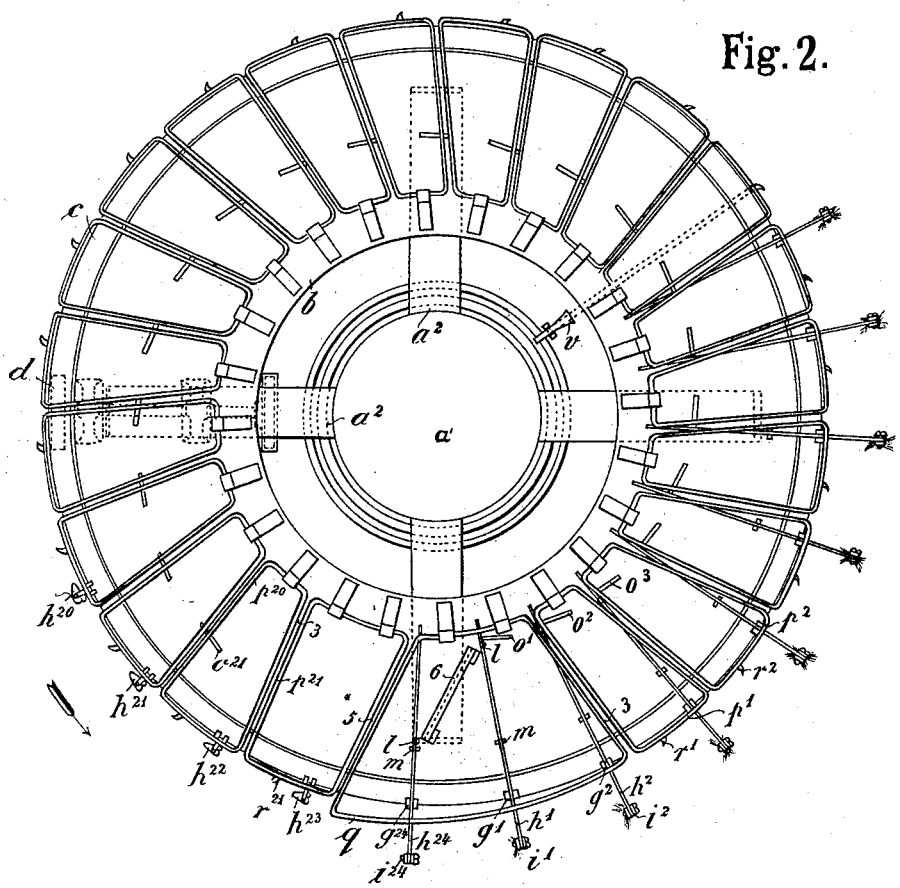

In the accompanying drawings, Figure 1 is partly an elevation and partly a vertical section of the weighing and sorting machine. Fig. 2 is a plan of the same. Fig. 3 shows a portion of Fig. 1 in a larger scale. Figs. 4, 5, 6, and 7 show guides in a larger scale.

On a standard $a$, consisting of a hollow socle $a'$, of four metal strips $a^2$, secured to the socle and bent outwardly at the top, and of two rings $s$ and $z$, a circular table-top $b$ is fixed, and concentrically with same a driving-ring $c$ is rotated by means of a friction-disk $d$. This ring is carried by the rollers $e$, Fig. 3, and guided in horizontal direction by the rollers $f$. On the periphery of the driving-ring $c$ a number of identically-constructed levers $h'$ to $h^{24}$, with arms 1 and 2, are pivoted on brackets $g'$ to $g^{24}$ in such a way that they can be turned both in a vertical and a horizontal direction. Each of these levers carries at the extremity of its outer arm 2 a movable suspender $i$, Fig. 3, for holding the skeins that are to be weighed. The suspender $i$ is a hook made of wire and adapted to support a skein. For the purpose of balancing the lever-arms an adjusting-weight $k$ is screwed on the outer arm 2 of each lever. On the other arm, 1, of each lever a sliding weight $l$, Fig. 3, having a bore at one end, is mounted so that it can be moved to and fro thereon, and a pin $m$ is fitted thereto to prevent the weight from sliding too far when the lever assumes a vertical position. All the sliding weights $l^1$ to $l^{24}$ weigh the same.

A ring $n$, fastened to the table $b$, serves as a support for the longer arm 1 of the lever during the time it is in a horizontal position, whereas when it is raised to a vertical position a pin 7, projecting from the bracket $g$, serves as a stop and prevents the lever from falling too far. Upon the top of the table $b$ a number of propellers $o'$ to $o^{21}$ are also fixed, so placed individually and in relation to each other as to form a spiral track, and the sliding weights $l$ successively encounter them as the ring $c$ rotates and are by each propeller pushed a little outward toward the fulcrum of the lever.

Figures 4, 5:
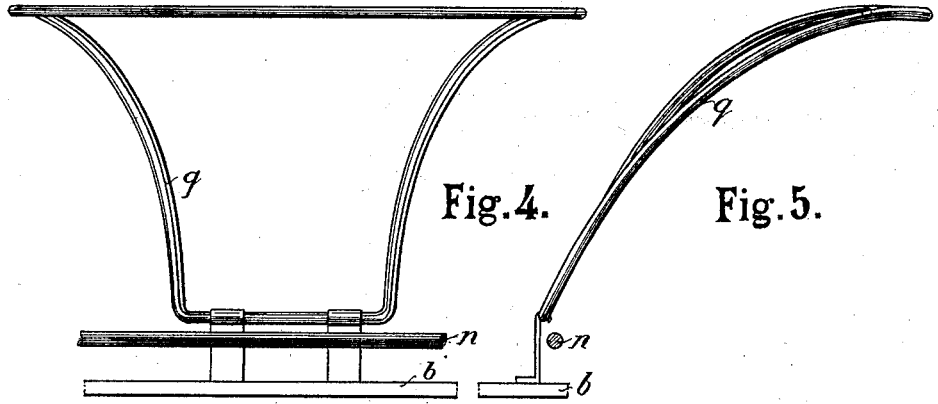

In order to effect a positive movement of the levers when disturbed in their position of equilibrium, a number of guides $p'$ to $p^{21}$ are fixed above the ring $n$ and concentric therewith. For this purpose a bracket 10 is soldered to the lower part of each guide $p$ (see Figs. 6 and 7) and fixed to the table $b$. The guides $p'$, &c., consist of wires bent to a curved rhomboid, the top overhanging the bottom, which leaving a small space is situated vertically above the ring $n$. The bottom of each guide $p$ is slightly inclined so that the adjacent corner 4 of a following guide is below the corner of the preceding guide. (See Figs. 1 and 6.) Between each pair of these guides a space or slit 3 is left to permit of the ascent of the lever-arm 1. Between the last and the first of the said guides $p^{21}$ and $p'$ and separated from the former by an intervening space 5, similar to the spaces 3, a fixed guide $q$, Figs. 1, 4, and 5, is placed, the purpose of which is to bring back the levers $h$ and $h^{24}$ from a vertical position into their original horizontal position before the completion of an entire revolution of the driving-ring $c$. For this purpose the guide $q$ is made to project at the top corner into the path of these levers, (see Fig. 2,) so that they are compelled to turn with their arms 1 into the space 5 along this guide back into the horizontal position. Under each of the guides $p'$ to $p^{21}$ a hook-shaped pointed doffer $r$ ($r'$ to $r^{21}$) is pivoted, which reaches up to the lower end of the suspenders $i$ when the levers $h$ are in a vertical position, and the doffers $r$ are pivoted on a ring $s$, which is fixed round the standard $a$. An arm $t$ projects from or near its pivot $u$ to a carrying-lever $v$ on its upper end, actuated by a spring. The said lever $v$ is provided with a hook $w$, engaging in a groove in a ring $z$, also fastened to the standard $a$, by which the doffer $r$ is held in position.

In order to restore the sliding weights $l$ to their original position on the levers $h$, an oblique guide-plate 6 is attached to the table $b$ underneath the guide $q$, with which the weights $l$ come in contact, pushing them back to the rear, while the lever-arms move forward over it.

During the rotation of the ring $c$ a skein, which it is required to weigh, is hung upon the suspender $i$ of a lever $h$ when its sliding weight $l$ is to the rear end of the lever-arm 1. Either the skein outweighs and overbalances the sliding weight or it does not. In the latter case—that is, when the skein proves the lighter—the inner end of the lever slides unchanged along the bottom supporting-ring $n$, and the sliding weight comes into contact successively with the propellers $o\ o'\ o^2$, which are placed more and more to the outside, whereby the weight is propelled by each a small distance toward the fulcrum of the lever. The moment of the sliding weight is thus gradually diminished, while that of the load remains the same and finally outweighs the former. The inner end of the lever immediately rises from the supporting-ring and slides along the upper guide $p$ until, coming into contact with the nose 4, it is raised through the slit or space 3 into a vertical position. The suspender $i$, belonging to same lever, now moves off close over the next doffer $r$, when the skein is taken off and glides away on it. This lever completes the further part revolution of the ring $c$ in its vertical position until it knocks against the projecting nose of the guide $q$ and is carried along the side of this down the slit or space 5 into horizontal position again—that is, its original position. The sliding weight $l$ is thereupon also carried back into its original position along the guide-plate 6 and so that the lever $h$ is ready to receive a fresh skein.

The skeins which slide down the doffers $r$ can by releasing the hook $w$ on the lever $v$, which enables the doffers to be turned, be easily taken off the latter.

As each propeller $o$ pushes the sliding weight of each lever $h$ forward the same distance and all the sliding weights are of the same weight and the levers move centrally, the levers when out of equilibrium and bearing the same load all tip at a certain part of the table, and each doffer thus carries a load of uniform weight.

What I claim is—

1. In a weighing and sorting machine for skeins of thread or yarn, the combination of levers serving as scales mounted upon a rotatable ring, weights arranged on the said levers so as to be movable along these levers, means for automatically shifting the said weights toward the fulcrum of the lever during the rotation of the levers, means for taking off and receiving the material from the levers, means for automatically reconducting the levers into their original position and means for automatically pushing back the weights into the initial position.

2. In a weighing and sorting machine for skeins of thread or yarn, the combination of levers serving as scales mounted upon a rotatable ring, weights arranged on the said levers so as to be movable along these levers, means for automatically shifting the said weights toward the fulcrum of the lever, guides for forcing the levers from their original position into such a position as to enable the suspended material to be taken off, means for taking off and receiving the material from the levers, means for automatically reconducting the levers into their original position and means for automatically pushing back the weights into their original position.

3. In a weighing and sorting machine for skeins of thread or yarn, the combination of levers serving as scales mounted upon a rotatable ring, weights arranged on the said lever so as to be movable along these levers, propellers forming a spiral track for successively shifting the weights toward the fulcrums of the levers, guides for forcing the levers from their original position into such a position as to enable the suspended material to be taken off, means for taking off and receiving the material from the levers, a guide for automatically reconducting the levers into their original position and a guide for pushing back the weights into their original position.

4. In a weighing and sorting machine for skeins of thread or yarn, the combination of levers serving as scales mounted upon a rotatable ring, weights arranged on said levers so as to be movable along these levers, means for automatically shifting the said weights toward the fulcrum of the lever during the rotation of the levers, means for taking off and receiving the material from the levers, means for automatically reconducting the levers into their original position, means for automatically pushing back the weights into the initial position and doffers having invariable stations, but pivotally mounted on the machine.

In testimony that I claim the foregoing I have hereunto set my hand this 27th day of March, 1903.

ALFRED LEHNER.

Witnesses:
   A. LIEBERKNECHT,
   HERMANN HUBER.